Figure 1:
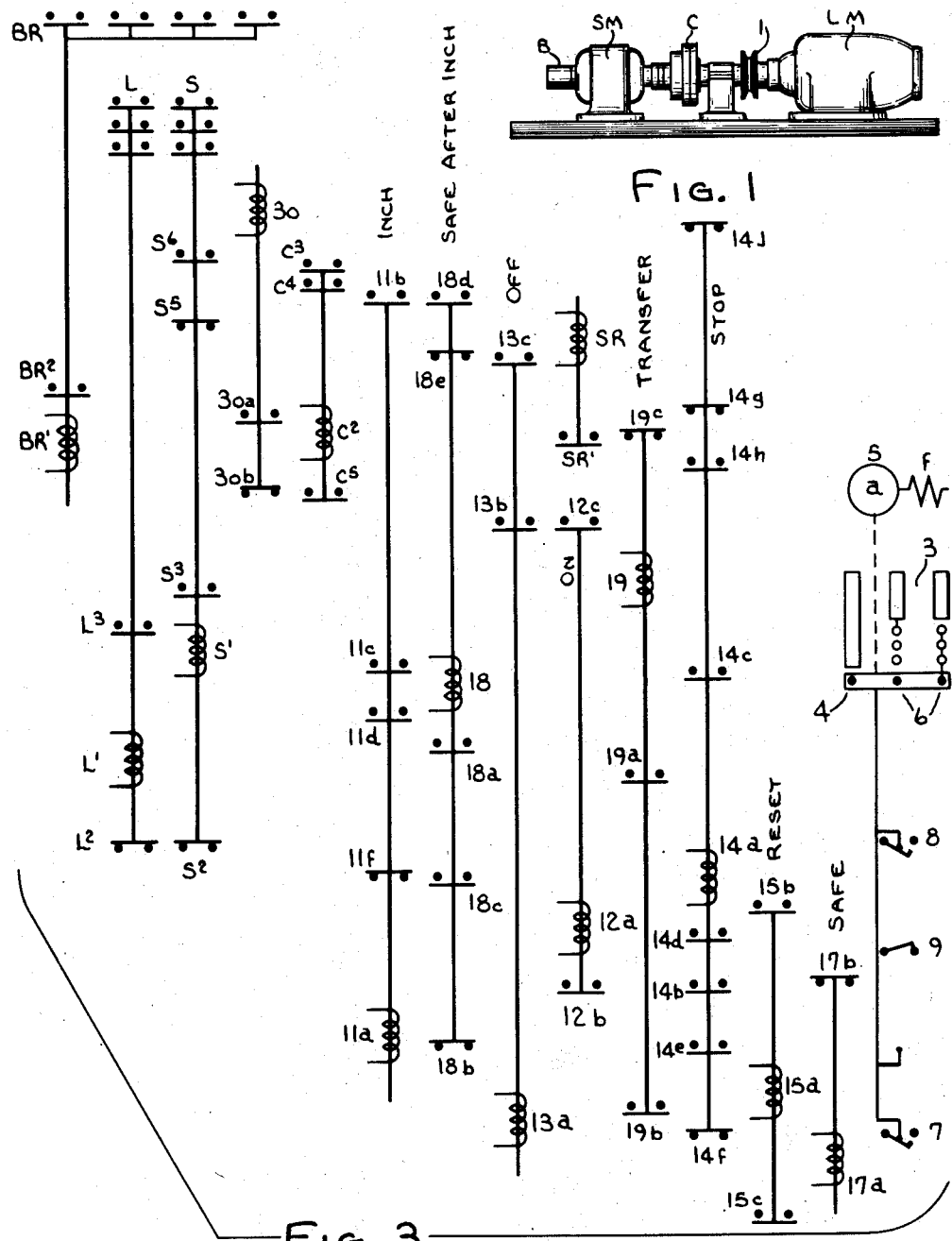

Sept. 22, 1953  C. P. FELDHAUSEN  2,653,283
CONTROL FOR MULTIMOTOR DRIVES
Filed April 18, 1951  2 Sheets-Sheet 2

INVENTOR.
CYRIL P. FELDHAUSEN

Patented Sept. 22, 1953

2,653,283

UNITED STATES PATENT OFFICE 2,653,283

CONTROL FOR MULTIMOTOR DRIVES

Cyril P. Feldhausen, Wauwatosa, Wis., assignor to Cutler-Hammer, Inc., Milwaukee, Wis., a corporation of Delaware Application April 18, 1951, Serial No. 221,668

25 Claims. (Cl. 318—46)

1

This invention relates to improvements in controls for multi-motor drives.

Multi-motor drives and controls therefor are disclosed in my prior Patents No. 2,252,762, granted August 19, 1941, and No. 2,379,072, granted June 25, 1945. In these patents a spring-actuated brake for one or both of the motors was electrically held in release position during operation of the motors. Upon disconnecting the motors from the circuit such brake was mechanically set by spring force. The braking torque was thus constantly fixed with the result that if adjusted to meet the requirements of an emergency stop from high speed such braking torque would not be proper when making stops from relatively low speeds. When the drive is applied to printing presses, slow speed, short, intermittent operation, commonly called "inching," must be carried out smoothly to prevent undue wear and strain on the mechanism or braking of the web of paper. Such operation requires a relatively low braking torque, especially on the small motor brake.

It is an object of this invention, therefore, to provide a control for a multi-motor drive which will effect stopping of the drive: by low braking torque when operating at slow speed under one motor; and by high braking torque when operating at higher speed under another motor.

Another object of this invention is to provide a multi-motor drive control having variable torque braking integrated with the electro-magnetic clutch coupling between motors so that upon so-called "inching" application the clutch will be fully energized and prevent additional wear in the clutch members.

Still another object of this invention is to provide a multiple drive control with variable torque braking cooperable with electro-magnetic clutch coupling which utilizes the speed of the drive to maintain satisfactory relations.

A further object of this invention is to provide a control for a multi-motor drive having at least one gear head motor which control during a stopping period will prevent coupling between the motors unless full torque braking is applied to the gear head motor to prevent it from being unrestrictedly rotated by other motors at damaging speeds.

A still further object of this invention is to provide control for a multi-motor drive having at least one motor provided with electrical braking which control during the stopping of said motor will couple such motor to another motor and apply braking torque to said later motor

2 to prevent said first motor from reversing its direction of rotation as it approaches zero speed.

These objects are obtained by utilizing a variable electrically energized mechanical brake for one of the motors of the drive (preferably small motor driving through reducing gears) which is operated from a source of D. C. voltage and controlled (as to low and high torque) with the magnetic clutch (also energized from said source) by manually operated circuits or pilot motor-controlled circuits, tachometer generator-controlled circuits, and a relay responsive to the electrical energization of the mechanical brake so that: with the drive at rest both brake and clutch are energized at low voltage; with the small motor energized for inching the brake is released and the clutch energized at high voltage (to prevent wear); with the small motor disconnected after inching the brake is energized at low voltage and the clutch energized at low voltage; with the small motor operating a steady speed (threading) the brake is released and the clutch energized at normal voltage; when the load is being transferred from the small motor to the large motor both the brake and clutch are released; when such transfer is completed the small motor is deenergized and the brake is energized at low voltage while the clutch remains released; and when an emergency stop from full speed (large motor) is needed the brake is energized at high voltage and the clutch at low voltage, but the clutch will not become effective unless the brake is so energized.

Figure 2:
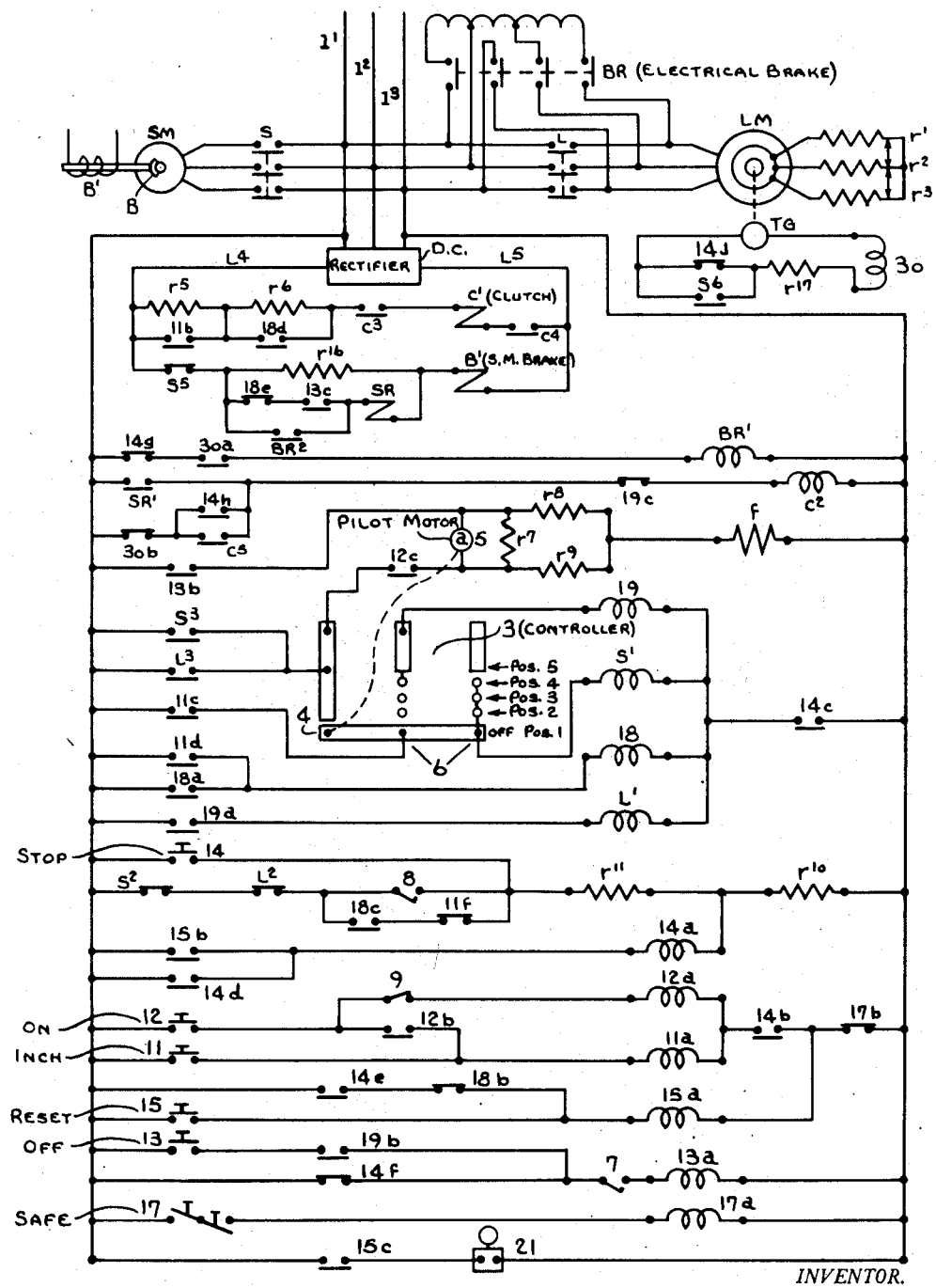

The novel features which are considered characteristic of the invention are set forth with particularity in the appended claims. The invention itself, however, both as to its organization and its method of operation, together with additional objects and advantages thereof, will best be understood from the following description of the specific embodiment when read in connection with the accompanying drawing in which:

Fig. 1 is a schematic view of the multi-motor drive to which the control is applied;

Fig. 2 is a line diagram of a form of control means embodying the present invention; and Fig. 3 is a chart showing in vertical alinement the relays and contacts operated thereby and the pilot-operated controller and the contacts operated by it which comprise the control means of Fig. 2. By horizontally alining this chart with the line diagram of Fig. 2, the chart acts as an index to locate on Fig. 2 the contacts operated by each relay and the controller.

Referring to the drawing, the reference letters and numerals used in Patent No. 2,379,072 are here used (wherever practical) to designate those elements of the multi-motor drive herein described which are also found in such patent. Wherever the element and its function are the same in this improvement as in such patent the element will not be described in detail and reference may be made to such patent for a detailed description. The relays shown schematically by their windings and the contacts controlled thereby are identified by the same principal reference character and individually identified by secondary reference characters. In Figs. 2 and 3 the relays are all shown in the deenergized state with the contacts shown open or closed as the case may be. Whenever a relay is energized all the contacts controlled by it (see vertical arrangement of Fig. 3) are changed. Those shown open are closed and those shown closed are opened.

In a manner well known to those skilled in this art, and as shown in Fig. 1, a large motor (or a main drive unit consisting of interconnected smaller motors) LM with a driving pulley 1 is coupled in a straight line to a small gear-head motor SM by an electro-magnetic clutch C. An electrically energized mechanical brake B is mounted on the small motor SM. An operating coil $C^1$ for the clutch C and an operating coil $B^1$ for the brake B are supplied with a source of direct current power from a rectifier D. C. by lines $L^4$ and $L^5$. The large motor LM, in addition to having its speed controlled by resistors $r^1$, $r^2$ and $r^3$ in its secondary circuit, also has electrical braking in its primary circuit controlled by multiple contacts BR. A full description of such an electrical brake is contained in Patent No. 2,436,412, issued February 24, 1948, on the application of Ralph P. Anderson. For the purpose of this improvement it is essential only to understand the correlation between the control of the electrical brake BR and the other control elements of the drive. Power for the motors is supplied from lines $l^1$, $l^2$ and $l^3$ through electromagnetic switch L for the large motor LM and electro-magnetic switch S for the small motor SM. A tachometer generator TG driven from the large motor LM is connected in a separate circuit with the winding 30 of a voltage regulator relay having contacts $30a$ and $30b$ which control the operation and synchronization of clutch C and the electrical brake BR.

The coil C′ of electro-magnetic clutch C is connectible across the direct current lines $L^4$ and $L^5$ by clutch relay contacts $C^3$ and $C^4$ in circuit with resistors $r^5$ and $r^6$. These resistors are respectively shorted by "inch" relay contacts 11b and "safe after inch" contacts 18d to control application of full power clutching for starting, normal power clutching for continuous running under the small motor SM, and low power clutching for braking.

The coil B′ of the electrically energized brake B is connectible across the direct current lines $L^4$ and $L^5$ by small motor switch relay contacts $S^5$ in circuit with a resistor $r^{16}$. This resistor is shorted either by "safe after inch" relay contacts 18e and "off" relay contacts 13e in circuit with a series relay SR or by electrical brake relay contacts $BR^2$ in circuit with said series relay SR. With the resistor $r^{16}$ in circuit a low braking torque is applied by the brake B. This is desirable during "inching" and after the small motor SM is deenergized and the drive is only through the large motor LM. However, whenever the resistor $r^{16}$ is shorted, maximum braking torque is obtained. This occurs whenever the "Stop" button 14 is closed with the drive operating under the large motor and the small motor deenergized.

The relay SR controls the normally open contacts SR′ in the circuit of the clutch coil C′ and will not close such contacts unless the brake coil B′ is being energized at full voltage. This prevents the large motor LM, during deceleration in stopping, from being coupled with small motor SM unless the brake B develops full braking torque. The full torque braking of brake B, operating through the reduction gearing of the small motor, is greater than the coupling torque of coupling C and hence the large motor cannot rotate the small motor at greatly increased damaging speeds.

In the embodiment herein described the tachometer generator circuit is used in place of the voltage relay V of Patent No. 2,379,072. The voltage produced in the tachometer generator TG is proportional to the speed of the large motor LM and during deceleration thereof is sufficient to maintain the relay 30 energized until approximately zero speed. However, on acceleration of the large motor a speed in excess of that at which transfer of the drive from small motor to large motor commences is required to produce enough voltage to energize relay 30. The relay 30 is connected across the tachometer generator terminals in series with $r^{17}$ and stop relay contact 14j. These latter contacts may be shunted by small motor switch relay contacts $S^6$. The tachometer circuit during operation of the drive by the small motor is thus ineffective; however, during operation of the drive by the large motor LM, relay 30, upon closing of contacts 14j by the Stop button 14 will be energized to put into effect electrical braking of large motor LM.

As is explained in detail in Patent No. 2,379,072, a crosshead type of controller 3, with its crosshead 4 driven by a pilot motor 5 with a field F arranged with resistors $r^7$, $r^8$ and $r^9$, controls and correlates the energizing and deenergizing of the large and small motors and the action of the clutch coil and brake coil so that a smooth transfer of load takes place between the motors. The manual switches associated with the controller and the relay circuits they control are identical with those described in such patent and reference thereto will make clear to those skilled in this art anything not apparent from the following description of operation.

Preliminary to operation

Before operation can be commenced, safe switch 17 must be opened as shown in the drawing to deenergize relay 17a and let contacts 17b be closed. Otherwise the manually operable switches Inch 11, On 12, and Reset 15 will have no effect. Then the Reset switch 15 must be temporarily closed to energize relay 15a; to close contacts 15c and start the alarm 21; and to close contacts 15b to energize the Stop relay 14a. The energizing of relay 14a changes the contacts controlled by it (see Fig. 3) so that the clutch coil C′ is connected in circuit with the resistances $r^5$ and $r^6$ and the manually operated Inch button 11 and On button 12 will be effective. The drive will be at rest with the clutch C and the brake B both energized at low voltage.

Inching

The operation of inching is used to slowly move the drive mechanism, e. g. press rolls, a short distance. The stopping must be gradual to prevent undue wear and vibration or breaking of the web. The operator first presses and then releases the Inch button 11 to effect such movement and stopping. However, to again start inching, the operator must first again momentarily close the Reset button 15. When the Inch button 11 is closed the Inch relay 11a, the small motor relay S', and the Safe After Inch relay 18 are all energized to reverse the position of the contacts controlled by them. At the same time relay 15a is deenergized. The effect of this is to start the small motor SM, deenergize the brake B completely, shunt resistances $r^5$ and $r^6$ to give full voltage engagement to clutch C (thus preventing slippage and wear), and stop the alarm 21.

When the Inch button 11 is released, relays 11a, S', 14a, and 18 are all deenergized and their respective contacts placed in the positions shown in Figs. 2 and 3. This cuts off power to the small motor SM, energizes the brake coil B' at low voltage to place the brake B under low brake torque, and places both resistances $r^5$ and $r^6$ in the clutch coil circuit to energize the clutch C at low torque coupling. The effect of this is to gradually and evenly stop the drive.

In order to commence another inching operation the Reset button 15 must first be closed to place the circuit in the condition described in the previous paragraph. In other words, the operator while engaged in inching momentarily depresses the Inch button 11, releases it when sufficient movement has taken place, and then momentarily depresses the Reset button in order to again inch.

Running

In order to constantly operate the drive from the small motor SM, such as is done in "threading" in the case of printing presses, or to permit the small motor to accelerate and have the load transferred from it to the large motor LM, it is first necessary that the circuits be established as explained under the heading Preliminary to operation. Thereafter the On button 12 is momentarily depressed to energize relays 12a, 11a, S', and 18 to reverse the position of the contacts controlled by such relays from that shown in Figs. 2 and 3. The effect is to start operation of the pilot motor 5 and of the small motor SM. The pilot motor 5 will continue by means of standard control mechanism (not shown) until the crosshead 4 moves from pos. 1 to pos. 2. However, the release of the On button 12 deenergizes relays 11a and 12a which places resistance $r^5$ back in the circuit of the clutch coil C' so that the clutch is then energized at normal voltage. The brake B is fully off and the small motor drives the pulley 1 at slow speed such as is used in printing press operation for "threading." Each time the On button 12 is momentarily depressed, the pilot motor will recommence operation and move the crosshead 4 upwardly to the next position. At any time during the operation of the small motor SM before its load is transferred to the large motor LM, it may be stopped by depressing the Stop button 14 to disconnect small motor contacts S and engage brake B at low torque. Since the contact 7 is closed the deenergization of stop relay 14a closes contacts 14f and relay 13a is energized to close contacts 13b and operate the pilot motor 5 in reverse direction to lower the crosshead 4 to Off position pos. 1.

When the crosshead 4 in its upward movement during the running of the small motor SM reaches pos. 4, relays 19, and L', are energized and relay $C^2$ deenergized. This effects the deenergization of the clutch coil C' to uncouple the motors, closing the large motor contacts L and starting such motor. The large motor LM, which has been rotated by the small motor at the speed of such small motor, now starts to accelerate to its lowest automatically controlled speed free of the small motor. In so doing it carries the load to which the drive is connected. The brake B at this time is still at zero torque and the small motor SM is running free. The On button 12 is again momentarily depressed to cause the pilot motor to move the crosshead to pos. 5. When the crosshead 4 reaches pos. 5, relay S' is deenergized and contacts S of the small motor opened. At the same time contacts $S^5$ close to energize brake coil B' at low torque. This results in stopping the small motor SM and maintaining it stopped under low torque brake while the drive is being operated by the large motor LM. The speed of the large motor is controlled in the well-known manner by resistances $r^1$, $r^2$, and $r^3$ in its secondary.

Stopping

It has previously been explained that the small motor SM when running may be stopped prior to the transfer of its load to the large motor LM by the Stop button 14. The small motor cannot be stopped by the depression of the Off button 13 because prior to such transfer the contacts 19 remain open. However, the large motor LM when it is operating the drive may be stopped by depressing either the Stop button 14 or the off button 13.

When the Off button 13 is depressed it energizes relay 13a and the pilot motor 5 is reversed to lower the crosshead 4 down to pos. 4. When the crosshead 4 reaches pos. 4, the relay S' is energized to start the small motor SM with zero torque on brake B and relay 30 is connected with tachometer generator TG. By keeping the Off button 13 depressed the crosshead 4 moves down to pos. 3 deenergizing the relays 19 and L' to disconnect the large motor LM. However, relay 30 holds contacts 30b open to prevent the clutch relay $C^2$ from becoming energized until the large motor LM slows down to approximately zero speed. Since the stopping of the large motor LM is checked at pos. 3 or pos. 2, the clutch C will become energized as the speeds of the motors become approximately the same. The large motor LM will now be deenergized. However, to completely stop the drive, the Stop button 14 must be depressed to disconnect the small motor SM, apply the brake B at low torque, and move crosshead 4 to pos. 1. This brings the drive to a slow stop and with all the relays except relay $C^2$ deenergized as shown in Figs. 2 and 3. Relay $C^2$ will remain in circuit as contacts $C^5$ are maintained closed by such relay.

When the Stop button 14 is depressed with the drive operating under the large motor LM, the relays 14a, 19, S', 18, and L', are all deenergized. The relay 30, however, is placed in circuit with the tachometer generator TG and closes the contacts 30a to energize relay BR'. This applies the electrical brake BR on the large motor LM. The circuit is also closed to the brake coil B' at full voltage and the relays SR and $C^2$ energized to apply low voltage to the clutch coil C'. This brakes both motors at full torque while coupled at low coupling torque to bring the drive to a rapid stop. As the large motor LM decelerates to approximately zero speed the electrical brake BR tends to reverse the direction of rotation of such large motor. If because of the sticking of the electrical brake contacts such electrical brake is not disconnected at approximately zero speed of the large motor LM, the action of the brake B and coupling C, which are energized as just described, will prevent the electrical brake BR from reversing the direction of rotation of the large motor LM and thus prevent any damage to the machinery connected thereto, such as printing press or the like, by the reversal of normal rotation thereof.

If for some reason contacts BR² should fail to close, the brake coil would still be energized. Thus braking would still be obtained even if the tachometer generator should fail for some reason, such as belt breakage.

Although only one embodiment of the invention is shown and described herein, it will be understood that this application is intended to cover such changes or modifications as come within the spirit of the invention or scope of the following claims:

I claim:

1. A multi-motor drive comprising a first motor for starting and slow speed operation, a second motor for higher speed operation, coupling means for connecting and disconnecting said motors, a variable electrically energized brake for said first motor, and control means for automatically selecting one of several degrees of energization of said brake and for automatically varying the energization of said clutch in response to the degree of energization selected.

2. A multi-motor drive comprising a first motor for starting and slow speed operation, a second motor for higher speed operation, coupling means for connecting and disconnecting said motors, said coupling means being variably energized, a variable electrically energized brake for said first motor, and control means for automatically selecting one of several degrees of energization of said brake and for automatically varying the energization of said clutch in response to the degree of energization selected.

3. A multi-motor drive comprising a first motor for starting and slow speed operation, a second motor for higher speed operation, coupling means for conecting and disconnecting said motors, a variable electrically energized brake for said first motor, an electrical brake for said second motor, and control means dependent upon the speed of said second motor for automatically controlling the degree of energization of said brake and for automatically varying the energization of said clutch in response to the degree of energization of said brake.

4. A multi-motor drive comprising a first motor for starting and slow speed operation, a second motor for higher speed operation, coupling means for connecting and disconnecting said motors, said coupling means being variably energized, a variable electrically energized brake for said first motor, control means for automatically selecting the degree of energization of said brake, an electrical brake for said second motor, and control means dependent upon the speed of said second motor for automatically controlling the degree of energization of said brake and for automatically varying the energization of said clutch in response to the degree of energization of said brake.

5. A multi-motor drive comprising a first motor for starting and slow speed operation, a second motor for higher speed operation, coupling means for connecting and disconnecting said motors capable of low, intermediate, or high torque coupling or decoupling, a variable electrically energized brake for said first motor capable of producing zero, low, or high braking torque, and control means for causing said coupling means to engage at high torque and said brake to produce zero braking torque as said drive is started by said first motor.

6. A multi-motor drive comprising a first motor for starting and slow speed operation, a second motor for higher speed operation, coupling means for connecting and disconnecting said motors capable of low, intermediate, or high torque coupling or decoupling, a variable electrically energized brake for said first motor capable of producing zero, low, or high braking torque, and control means for causing said coupling means to engage at high torque and said brake to produce zero braking torque as said drive is started by said first motor and to cause said brake to produce low braking torque as said drive is being stopped after operation by said first motor.

7. A multi-motor drive comprising a first motor for starting and slow speed operation, a second motor for higher speed operation, coupling means for connecting and disconnecting said motors capable of low, intermediate, or high torque coupling or decoupling, a variable electrically energized brake for said first motor capable of producing zero, low, or high braking torque, and control means for causing said coupling means to engage at low torque and said brake to produce low braking torque as said drive is being stopped from operation by said first motor.

8. A multi-motor drive comprising a first motor for starting and slow speed operation, a second motor for higher speed operation, coupling means for connecting and disconnecting said motors capable of low, intermediate, or high torque coupling or decoupling, a variable electrically energized brake for said first motor capable of producing zero, low, or high braking torque, and control means for causing said coupling means to engage at intermediate torque and said brake to produce zero braking torque as said drive is being run at low speed by said first motor.

9. A multi-motor drive comprising a first motor for starting and slow speed operation, a second motor for higher speed operation, coupling means for connecting and disconnecting said motors capable of low, intermediate, or high torque coupling or decoupling, a variable electrically energized brake for said first motor capable of producing zero, low, or high braking torque, and control means for causing said coupling means to decouple and said brake to produce zero braking torque with said first motor running and said second motor accelerating.

10. A multi-motor drive comprising a first motor for starting and slow speed operation, a second motor for higher speed operation, coupling means for connecting and disconnecting said motors capable of low, intermediate, or high torque coupling or decoupling, a variable electrically energized brake for said first motor capable of producing zero, low, or high braking torque, and control means for causing said coupling means to decouple and said brake to produce zero braking torque with said first motor running and said second motor accelerating and to cause said brake to produce low torque braking as said first motor is deenergized after acceleration of said second motor.

11. A multi-motor drive comprising a first motor for starting and slow speed operation, a second motor for higher speed operation, coupling means for connecting and disconnecting said motors capable of low, intermediate, or high torque coupling or decoupling, a variable electrically energized brake for said first motor capable of producing zero, low, or high braking torque, and control means for causing said brake to produce low torque braking as said first motor is deenergized after said drive is being operated by said second motor.

12. A multi-motor drive comprising a first motor for starting and slow speed operation, a second motor for higher speed operation, coupling means for connecting and disconnecting said motors capable of low, intermediate, or high torque coupling or decoupling, a variable electrically energized brake for said first motor capable of producing zero, low, or high braking torque, and control means for causing said coupling means to engage at low torque and said brake to produce high braking torque as drive is being stopped after operation by said second motor.

13. A multi-motor drive comprising a first motor for starting and slow speed operation, a second motor for higher speed operation, coupling means for connecting and disconnecting said motors capable of low, intermediate, or high torque coupling or decoupling, a variable electrically energized brake for said first motor capable of producing zero, low, or high braking torque, an electrical brake for said second motor, and control means for causing said coupling means to engage at low torque said first brake and said electrical brake to produce high braking torque as drive is being stopped after operation by said second motor.

14. A multi-motor drive comprising a first motor for starting and slow speed operation, a second motor for higher speed operation, coupling means for connecting and disconnecting said motors, a mechanical brake for said first motor normally biased to zero braking torque, a brake-operating coil for energizing said brake at low or high braking torque, a source of direct current power for energizing said brake-operating coil, a resistance adapted to be connected in series with said source and said brake-operating coil, and means including contacts engageable while said first motor is deenergized to connect said brake-operating coil and resistance to said source to apply low braking torque.

15. A multi-motor drive comprising, a first motor for starting and slow speed operation, a second motor for higher speed operation, coupling means for connecting and disconnecting said motors, a mechanical brake for said first motor normally biased to zero braking torque, a brake-operating coil for energizing said brake at low or high braking torque, a source of direct current power for energizing said brake-operating coil, a resistance adapted to be connected in series with said source and said brake-operating coil, and means including contacts engageable at will when said drive is being operated by said second motor to shunt said resistance and to connect said brake-operating coil to said source to apply high braking torque.

16. A multi-motor drive comprising a first motor for starting and slow speed operation, a second motor for higher speed operation, coupling means for connecting and disconnecting said motors, a mechanical brake for said first motor normally biased to zero braking torque, a brake-operating coil for energizing said brake at low or high braking torque, a source of direct current power for energizing said brake-operating coil, a resistance adapted to be connected in series with said source and said brake-operating coil, means including contacts engageable at will when said drive is being operated by said second motor to shunt said resistance and to connect said brake-operating coil to said source to apply high braking torque, and relay means energizable when said resistance is shunted to cause said coupling means to connect said motors.

17. A multi-motor drive comprising a first motor for starting and slow speed operation, a second motor for higher speed operation, a mechanical brake for said first motor normally biased to zero braking torque, a brake-operating coil for energizing said brake at low or high braking torque, a source of direct current power for energizing said brake-operating coil, a resistance adapted to be connected in series with said source and said brake-operating coil, a coupling for connecting and disconnecting said motors normally biased to decouple and including a clutch-operating coil adapted to be energized by said source to produce low, intermediate or high torque coupling, a plurality of resistances adapted to be connected in series with said clutch-operating coil, means including contacts engageable while said first motor is deenergized to connect said brake-operating coil and resistance to said source to apply low braking torque, and other contacts engageable at will to start said drive to connect said clutch-operating coil in circuit with said source with all said last named resistances shunted to apply high torque coupling.

18. A multi-motor drive comprising a first motor for starting and slow speed operation, a second motor for higher speed operation, a mechanical brake for said first motor normally biased to zero braking torque, a brake-operating coil for energizing said brake at low or high braking torque, a source of direct current power for energizing said brake-operating coil, a resistance adapted to be connected in series with said source and said brake-operating coil, a coupling for connecting and disconnecting said motors normally biased to decouple and including a clutch-operating coil adapted to be energized by said source to produce low, intermediate or high torque coupling, a plurality of resistances adapted to be connected in series with said clutch-operating coil, means including contacts engageable while said first motor is deenergized to connect said brake-operating coil and resistance to said source to apply low braking torque, and other contacts engageable at will to start said drive to connect said clutch-operating coil in circuit with said source with all said last named resistances shunted to apply high torque coupling, said other contacts being disengageable at will when said drive is in operation to shunt at least one of said last named resistances to apply intermediate torque coupling.

19. A multi-motor drive comprising a first motor for starting and slow speed operation, a second motor for higher speed operation, a mechanical brake for said first motor normally biased to zero braking torque, a brake-operating coil for energizing said brake at low or high braking torque, a source of direct current power for energizing said brake-operating coil, a resistance adapted to be connected in series with said source and said brake-operating coil, a coupling for connecting and disconnecting said motors normally biased to decouple and including a clutch-operating coil adapted to be energized by said source to produce low, intermediate or high torque coupling, a plurality of resistances adapted to be connected in series with said clutch-operating coil, means including contacts engageable at will when said drive is being operated by said second motor to shunt said resistance and to connect said brake-operating coil to said source to apply high braking torque, and contacts engageable at will when said drive is in operation to shunt all of said last named resistances to apply low torque coupling.

20. A multi-motor drive comprising a first motor for starting and slow speed operation, a second motor for higher speed operation, a mechanical brake for said first motor normally biased to zero braking torque, a brake-operating coil for energizing said brake at low or high braking torque, a source of direct current power for energizing said brake-operating coil, a resistance adapted to be connected in series with said source and said brake-operating coil, a coupling for connecting and disconnecting said motors normally biased to decouple and including a clutch-operating coil adapted to be energized by said source to produce low, intermediate or high torque coupling, a plurality of resistances adapted to be connected in series with said clutch-operating coil, means including contacts engageable at will when said drive is being operated by said second motor to shunt said resistance and to connect said brake-operating coil to said source to apply high braking torque, relay means energizable when said resistance is shunted to cause said coupling means to connect said motors, and contacts engageable at will when said drive is in operation to shunt all of said last named resistances to apply low torque coupling.

21. A multi-motor drive comprising a first motor for starting and slow speed operation, a second motor for higher speed operation, a variable electrically energized brake for said first motor, a coupling for connecting and disconnecting said motors normally biased to decouple and including a clutch-operating coil adapted to be energized by said source to produce low, intermediate or high torque coupling, a plurality of resistances adapted to be connected in series with said clutch-operating coil, and control means including relays and contacts for selecting the degree of energization of said brake and to connect said coil in circuit with said source with selected ones of said resistances to obtain low torque braking and low torque coupling upon stopping after slow drive by said first motor.

22. In a multi-motor drive having a plurality of motors and coupling means for connecting and disconnecting said motors, separate brakes for each motor, at least one of said brakes being adapted to apply both a low and high braking torque, and control means to energize said one of said brakes at a selected low or high braking torque and to energize said coupling means or the others of said brakes depending upon the speed from which stopping is to be accomplished.

23. In a multi-motor drive, a main driving unit, means for connecting said unit to a driven device, a secondary driver having a brake, speed-reducing mechanism connected with said driver and having a power take-off, coupling means for connecting and disconnecting said unit and said take-off, and means operable as function of the energization of the brake on said secondary drive to prevent said coupling means from connecting said unit during deceleration thereof to said take-off unless said brake is energized.

24. In a multi-motor drive, a main driving unit, means for connecting said unit to a driven device, a secondary driver having a brake, an electrical circuit including a brake-energizing coil and a resistance for applying power to said brake, speed-reducing mechanism connected with said driver and having a power take-off, coupling means for connecting and disconnecting said unit and said take-off, a second electrical circuit including a relay for controlling operation of said coupling means, a shunt for said resistance including a second relay operable only upon energization of said brake-energizing coil with said resistance shunted, and contacts in said second circuit held closed by said second relay whereby during deceleration of said main driving unit said coupling means cannot be energized unless said brake-energizing coil is energized with said resistance shunted.

25. In a multi-motor drive, a main driving unit adapted for connection with a driven device, electrical braking for said unit having a tendency to reverse rotation of said unit as said unit while decelerating approaches zero speed, a secondary driver having a brake, coupling means for connecting and disconnecting said unit and said secondary driver, and automatic control means causing both the brake for said secondary driver and said coupling means to be energized and prevent said main unit from reversing rotation under the influence of said electrical braking.

CYRIL P. FELDHAUSEN.

References Cited in the file of this patent
UNITED STATES PATENTS

| Number | Name | Date |
| --- | --- | --- |
| 2,062,135 | Lija | Nov. 24, 1936 |
| 2,153,195 | Lija | Apr. 4, 1939 |
| 2,214,901 | Griffin | Sept. 17, 1940 |
| 2,252,762 | Feldhausen | Aug. 19, 1941 |
| 2,259,574 | Lillquist | Oct. 21, 1941 |
| 2,333,863 | Hull | Nov. 9, 1943 |
| 2,354,950 | Feldhausen | Aug. 1, 1944 |
| 2,379,072 | Feldhausen | June 26, 1945 |
| 2,411,122 | Winther | Nov. 12, 1946 |
| 2,436,413 | Anderson | Feb. 24, 1948 |